(12) United States Patent
Nagata et al.

(10) Patent No.: US 10,421,389 B2
(45) Date of Patent: Sep. 24, 2019

(54) VEHICLE LIGHTING SYSTEM

(71) Applicant: TOYOTA JIDOSHA KABUSHIKI KAISHA, Toyota-shi, Aichi-ken (JP)

(72) Inventors: Shinichi Nagata, Yokohama (JP); Shinya Kawamata, Mishima (JP); Kazuyuki Fujita, Gotenba (JP); Minami Sato, Ebina (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 72 days.

(21) Appl. No.: 15/451,998

(22) Filed: Mar. 7, 2017

(65) Prior Publication Data

US 2017/0259728 A1    Sep. 14, 2017

(30) Foreign Application Priority Data

Mar. 11, 2016    (JP) ................... 2016-048889

(51) Int. Cl.
*H04N 7/18* (2006.01)
*B60Q 1/00* (2006.01)
(Continued)

(52) U.S. Cl.
CPC ............ *B60Q 1/0023* (2013.01); *B60K 35/00* (2013.01); *B60Q 1/085* (2013.01); *B60Q 1/28* (2013.01); *B60Q 1/46* (2013.01); *B60Q 5/006* (2013.01); *B60Q 9/004* (2013.01); *B60Q 9/005* (2013.01); *B60Q 9/006* (2013.01); *G01S 13/867* (2013.01);
(Continued)

(58) Field of Classification Search
CPC ... H04N 7/18; B60Q 1/00; B60Q 1/28; B60Q 1/46; B60Q 1/0023; B60Q 2300/05; B60Q 2300/33; B60Q 2300/45; G01S 13/93; G01S 13/86; G01S 13/867; G01S 13/931;
(Continued)

(56) References Cited

U.S. PATENT DOCUMENTS 9,024,740 B2 * 5/2015 Min .................. B60Q 1/085
340/425.5
9,108,568 B2 * 8/2015 Takahira ............. B60Q 1/0023
(Continued)

FOREIGN PATENT DOCUMENTS

EP    2420986 A1    2/2012
EP    2787497 A1    10/2014
(Continued)

*Primary Examiner* — Trang U Tran
(74) *Attorney, Agent, or Firm* — Sughrue Mion, PLLC

(57) ABSTRACT

A vehicle lighting system includes: a lighting device that emits a first light and a second light to a periphery of an own vehicle, the second light having a higher directivity than the first light; a camera to acquire image information; a detector to emit an electromagnetic wave and acquire a reflection wave; and an electronic control unit configured to detect a physical body using the image information, detect the physical body using information of the reflection wave, control the lighting device such that the first light is emitted to the physical body detected by the reflection wave, determine whether the physical body detected using the image information in a state where the first light is being emitted is an target object, and control the lighting device such that the lighting device emits the second light toward a predetermined range around the target object.

16 Claims, 11 Drawing Sheets

(51) Int. Cl.

| | | |
|---|---|---|
| *B60Q 1/28* | (2006.01) | |
| *B60Q 1/46* | (2006.01) | |
| *G01S 13/86* | (2006.01) | |
| *G01S 13/93* | (2006.01) | |
| *G06K 9/00* | (2006.01) | |
| *B60K 35/00* | (2006.01) | |
| *B60Q 5/00* | (2006.01) | |
| *B60Q 9/00* | (2006.01) | |
| *G08G 1/16* | (2006.01) | |
| *B60Q 1/08* | (2006.01) | |
| *B60R 21/0134* | (2006.01) | |

(52) U.S. Cl.
CPC ........ *G01S 13/931* (2013.01); *G06K 9/00369* (2013.01); *G06K 9/00805* (2013.01); *G08G 1/166* (2013.01); *B60K 2370/188* (2019.05); *B60K 2370/20* (2019.05); *B60K 2370/21* (2019.05); *B60K 2370/29* (2019.05); *B60K 2370/334* (2019.05); *B60K 2370/797* (2019.05); *B60Q 2300/05* (2013.01); *B60Q 2300/33* (2013.01); *B60Q 2300/45* (2013.01); *B60Q 2400/50* (2013.01); *B60R 21/0134* (2013.01); *B60R 2300/301* (2013.01); *B60R 2300/307* (2013.01); *B60R 2300/8033* (2013.01); *B60R 2300/8093* (2013.01); *B60W 2420/403* (2013.01); *B60W 2420/42* (2013.01); *B60W 2420/52* (2013.01); *B60W 2550/10* (2013.01)

(58) Field of Classification Search
CPC ... G60K 9/00; G60K 9/00369; G60K 9/00805
USPC ...................................... 348/148; 340/425.5
See application file for complete search history.

(56) References Cited

U.S. PATENT DOCUMENTS

| | | | | |
|---|---|---|---|---|
| 9,168,867 | B2 * | 10/2015 | Tamatsu | ................ B60Q 5/005 |
| 2014/0062685 | A1 | 3/2014 | Tamatsu et al. | |
| 2014/0368668 | A1 | 12/2014 | Sasabuchi et al. | |
| 2015/0348416 | A1 | 12/2015 | Fujita et al. | |
| 2015/0375672 | A1 | 12/2015 | Takahashi | |
| 2017/0144584 | A1 | 5/2017 | Asaoka | |

FOREIGN PATENT DOCUMENTS

| | | |
|---|---|---|
| JP | 2011-084106 A | 4/2011 |
| JP | 2013-119357 A | 6/2013 |
| JP | 2014-46838 A | 3/2014 |
| JP | 2014-191485 A | 10/2014 |
| WO | 2014/010546 A1 | 1/2014 |
| WO | 2015190299 A1 | 12/2015 |

* cited by examiner

FIG. 6

|  | EMISSION RANGE | ILLUMINANCE | COLOR TONE | FLASHING |
|---|---|---|---|---|
| FIRST EMISSION LIGHT | WIDE | DARK | WHITE | OFF |
| SECOND EMISSION LIGHT | NARROW | BRIGHT | PALE ORANGE | ON |

VEHICLE LIGHTING SYSTEM

INCORPORATION BY REFERENCE

The disclosure of Japanese Patent Application No. 2016-048889 filed on Mar. 11, 2016 including the specification, drawings and abstract is incorporated herein by reference in its entirety.

BACKGROUND

1. Technical Field

The disclosure relates to the technical field of a vehicle lighting system.

2. Description of Related Art

As this kind of system, there is known a technology of giving a caution by emitting light toward an object existing in the periphery of the own vehicle. Japanese Patent Application Publication No. 2011-084106 (JP 2011-084106 A) proposes a technology of emitting light toward an object detected by an on-vehicle camera, using a light device whose emission direction can be controlled in a front-back direction and a right-left direction, and thereby making the object recognize the existence of the own vehicle.

SUMMARY

In the technology described in JP 2011-084106 A, at a stage prior to the light emission, the camera detects the existence of a physical body that can be an object to which a caution needs to be given. However, in a camera that performs capture using visible light, there could be a case that the physical body existing in the periphery of the vehicle cannot be exactly detected in a situation of a dark environment during night-time or the like. Specifically, there can be a case where the existence of the physical body cannot be detected at all, or a case where the existence of the physical body can be detected but the attribute (for example, whether the object is a pedestrian or a vehicle) cannot be detected.

As described above, when the detection of the physical body existing in the periphery of the vehicle is insufficient, there is a fear that a proper caution cannot be given to the physical body. Specifically, when the attribute of the physical body cannot be discriminated, it is not possible to give a caution corresponding to the attribute of the physical body (for example, it is not possible to decide whether to give a caution intended for a pedestrian or give a caution intended for a vehicle), even when the existence of the physical body can be detected. Further, it is not possible to properly determine whether the physical body is an object to which the caution needs to be given, and there could be a case that the light is emitted to a physical body that is not the object, or the light is not emitted to a physical body that is the object.

The present disclosure provides a vehicle lighting system that can properly give a caution by emitting light.

An aspect of the present disclosure provides a vehicle lighting system. The vehicle lighting system according to the aspect of the present disclosure includes: a lighting device configured to emit a first light and a second light to a periphery of an own vehicle, the second light having a higher directivity than the first light; a camera configured to acquire image information by capturing the periphery of the own vehicle; a detector configured to emit an electromagnetic wave to the periphery of the own vehicle and acquire a reflection wave of the electromagnetic wave is reflected; and an electronic control unit configured to detect a physical body in the periphery of the own vehicle using the image information, detect the physical body using information of the reflection wave, control the lighting device such that the lighting device emits the first light to the physical body detected by the reflection wave, determine whether the physical body detected using the image information in a state where the first light is being emitted is an target object to which a caution needs to be given, and control the lighting device such that the lighting device emits the second light toward a predetermined range around the target object, when the physical body is the target object.

In the vehicle lighting system according to the aspect, a first light is emitted to the physical body detected by a detector using an electromagnetic wave. Thereby, the detection of the physical body by a camera using the image information is suitably performed. As a result, it is possible to exactly determine whether the physical body is the object, and to give a suitable caution with a second light.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a table showing differences in emission form between the first emission light and the second emission light;

DETAILED DESCRIPTION OF EMBODIMENTS

Embodiments of a vehicle lighting system in the disclosure will be described based on the drawings. Hereinafter, two embodiments of a first embodiment and a second embodiment will be described as examples.

First Embodiment

First, a vehicle lighting system according to the first embodiment will be described with reference to FIG. 1 to FIG. 8. In the following, a configuration of the vehicle lighting system, a possible problem at the time of the detection of a physical body by an on-vehicle camera, an operation of the vehicle lighting system, specific exemplary emissions, and technical effects to be obtained by the vehicle lighting system will be described in order.

<Configuration of Vehicle Lighting System>

First, the configuration of the vehicle lighting system according to the first embodiment will be described with reference to FIG. 1. Here, FIG. 1 is a block diagram showing the configuration of the vehicle lighting system according to the first embodiment.

Figure 1:
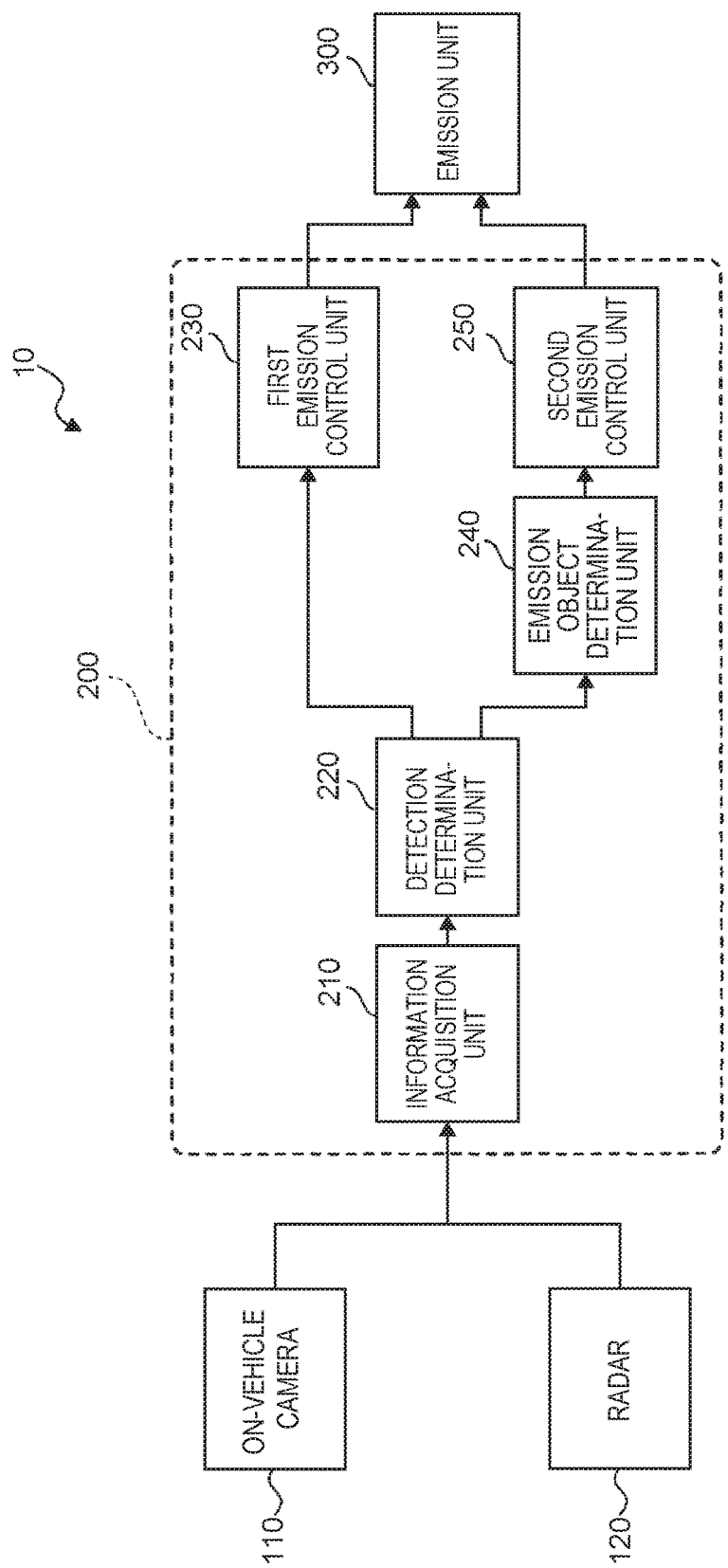
FIG. 1 is a block diagram showing a configuration of a vehicle lighting system according to a first embodiment.

In FIG. 1, a vehicle lighting system 10 according to the embodiment is mounted in a vehicle such as an automobile, and is configured to be able to give a caution about the own vehicle by emitting light toward an object (for example, a pedestrian) to which the caution needs to be given. The vehicle lighting system 10 is configured to include an on-vehicle camera 110, a radar 120, an ECU 200, and an emission unit 300.

The on-vehicle camera 110 is a camera that can capture a region in front of the vehicle (in other words, a region corresponding to the field of view of a driver). The on-vehicle camera 110 is a camera that performs the capture using visible light. The image data captured by the on-vehicle camera 110 is used for detecting the existence of a physical body in the capture range, or for detecting an attribute of the physical body. The image data captured by the on-vehicle camera 110 is output to an information acquisition unit 210.

The radar 120 is a radar that can recognize a physical body existing in a region in front of the vehicle. The radar 120 is configured to emit an electromagnetic wave such as a millimeter wave and a laser ray, to a periphery of the vehicle, and to be able to detect the position, moving speed and others of the physical body existing in the periphery of the vehicle, using the reflected electromagnetic wave. The radar 120, for example, is a millimeter radar, a laser radar, a LIDAR, or the like. The information about the physical body detected by the radar 120 is output to the information acquisition unit 210.

The electronic control unit (ECU) 200 is a controller unit that includes an arithmetic circuit such as a Central Processing Unit (CPU), and is configured to be able to control various operations in the vehicle. Particularly, the ECU 200 according to the embodiment is configured to be able to perform various controls for giving the caution by emitting an emission light described later. The ECU 200 includes the information acquisition unit 210, a detection determination unit 220, a first emission control unit 230, an emission object determination unit 240, and a second emission control unit 250, as logical or physical processing blocks that are actualized in the interior.

The information acquisition unit 210 is configured to be able to acquire information to be output from each of the on-vehicle camera 110, the radar 120 and an external illuminance sensor 130, as peripheral environment information (that is, information indicating the peripheral environment of the vehicle, particularly information about the physical body existing in the periphery of the vehicle). The peripheral environment information acquired by the information acquisition unit 210 is output to the detection determination unit 220.

The detection determination unit 220 is configured to be able to determine whether the physical body has been detected in the periphery of the own vehicle, based on the peripheral environment information. The "physical body" herein is an entity that can be an object to which the caution needs to be given, and typically, is a moving body such as a pedestrian, a bicycle and another vehicle. The detection determination unit 220 is configured to be able to output the peripheral environment information (containing the information about the detected physical body) to the first emission control unit 230 or the emission object determination unit 240, depending on the determination result.

The first emission control unit 230 is configured to be able to execute a control for emitting a first emission light to the physical body existing in the periphery of the vehicle (or to a position where the physical body is estimated to exist), based on the information input from the detection determination unit 220. The first emission light is a light for assisting the detection of the physical body by the on-vehicle camera 110, by brightly illuminating the physical body. Here, the first emission light may have a function to give a caution to the physical body, in addition to the function to assist the detection. The first emission control unit 230 decides, for example, emission direction, emission range, emission illuminance, emission color and others of the first emission light, and outputs a command to emit the first emission light, to the emission unit 300.

The emission object determination unit 240 is configured to be able to determine whether the physical body existing in the periphery of the vehicle is an object to which the caution needs to be given, based on the information input from the detection determination unit 220. The "object" herein is an object to which the caution needs to be given using the emission light, and examples thereof include a pedestrian who is crossing ahead a road on which the own vehicle is travelling. The determination result of the emission object determination unit 240 is output to the second emission control unit 250, together with the information about the physical body (that is, the object).

The second emission control unit 250 is configured to be able to execute a control for emitting a second emission light toward the object, based on the information input from the emission object determination unit 240. The expression "toward the object" herein includes a case of directly emitting the second emission light to the object, and a case of emitting the second emission light to a road surface in a predetermined range in the periphery of the object. Further, the "predetermined range in the periphery of the object" is a range in which the second emission light or an emission pattern drawn on the road surface by the second emission light is clear enough to be recognized by the object. The second emission control unit 250 decides, for example, emission direction, emission range, emission illuminance, emission color and others of the second emission light, and outputs a command to emit the second emission light, to the emission unit 300.

The emission unit 300 includes a light device (for example, a headlight of the vehicle) that can change, for the light to be emitted, the emission direction, the emission range, the emission illuminance, the emission color and the on-off of flashing, and is configured to be able to emit the first emission light or the second emission light, depending on the command from the first emission control unit 230 or the second emission control unit 250. For example, the emission unit 300 may be configured such that a micro electro mechanical system mirror reflects a laser beam emitted from a laser diode. The first emission light and the second emission light may be lights that are emitted from a common light device, or may be lights that are emitted from separate light devices. Further, the emission unit 300 may have a function to change the emission position to a proper position in response to the movement of the own vehicle or the object.

<Possible Problem at Time of Detection of Physical Body by On-Vehicle Camera>

Next, a possible problem at the time of the detection of the physical body by the on-vehicle camera 110 will be specifically described with reference to FIG. 2. Here, FIG. 2 is a top view showing detection ranges of the on-vehicle camera and the radar.

Figure 2:
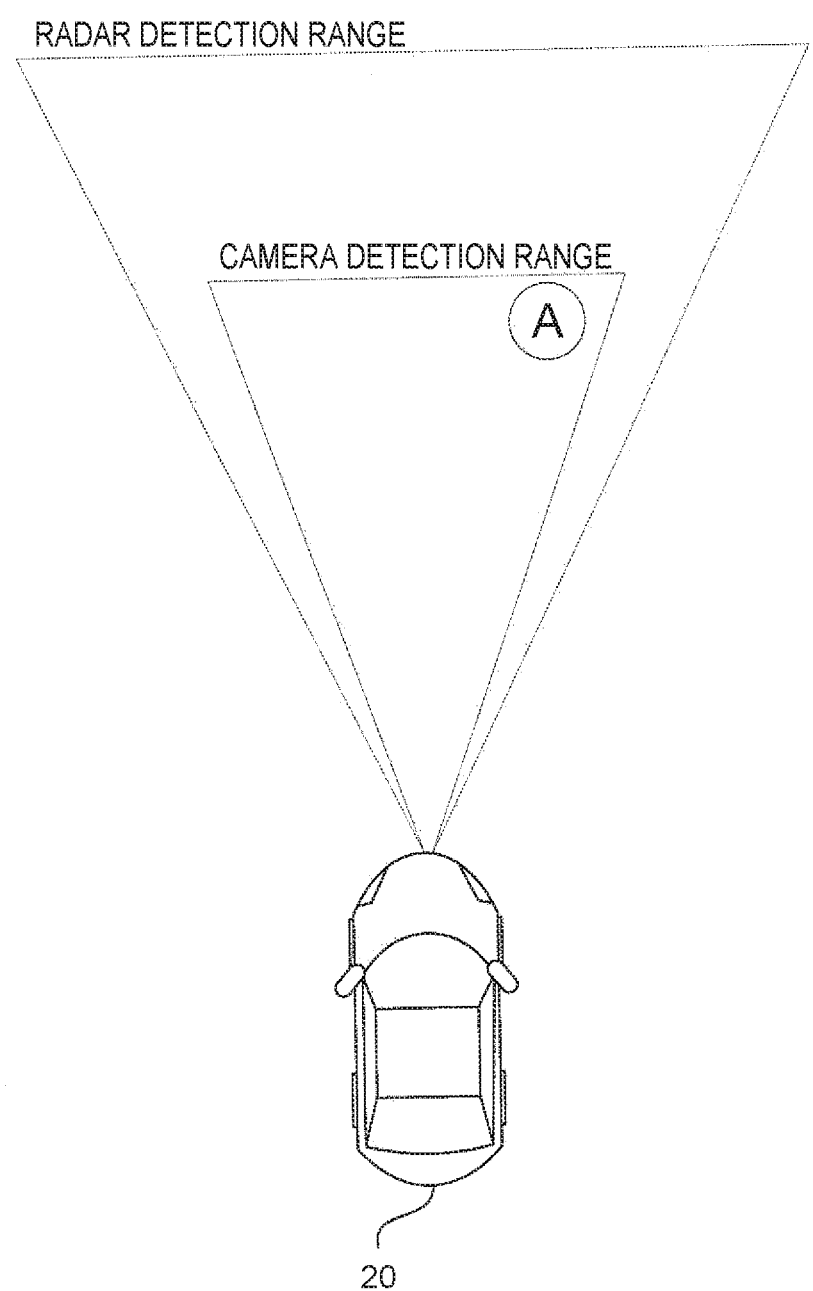
FIG. 2 is a top view showing detection ranges of an on-vehicle camera and a radar.

As shown in FIG. 2, the on-vehicle camera 110 and the radar 120 are configured to be able to detect a physical body existing in a range in front of an own vehicle 20. A range in which the on-vehicle camera 110 can exactly detect the physical body (hereinafter, referred to as a "camera detection range" when appropriate) overlaps with a range in which the radar 120 can exactly detect the physical body (hereinafter, referred to as a "radar detection range" when appropriate). Here, due to the characteristics of the on-vehicle camera 110 and the radar 120, the camera detection range is narrower than the radar detection range.

Therefore, a physical body A contained in both of the camera detection range and the radar detection range can be detected by both of the on-vehicle camera 110 and the radar 120. However, when the physical body A is in a situation of a dark environment during night-time or the like, because the on-vehicle camera 110 performs the capture using visible light, there is a possibility that the detection result of the on-vehicle camera 110 for the physical body A is insufficient while the radar 120 can detect the physical body A. More specifically, there is a possibility that the information about the physical body A cannot be sufficiently obtained from the on-vehicle camera 110 although the information can be sufficiently obtained from the radar 120. Therefore, although it is possible to detect the existence of the physical body based on the information obtained from the radar 120, it is difficult to detect more detailed information such as the attribute of the physical body.

Here, the control of the caution with the emission light (see a later-described operation), which can be executed by the vehicle lighting system 10 according to the embodiment, is executed in consideration of not only the existence of the physical body but also other specific information (that is, the attribute and the like) about the physical body. Therefore, if the information about the physical body has not been sufficiently obtained, there is a fear that the control of the caution cannot be suitably executed. In other words, in a state where the physical body has not been exactly detected by the on-vehicle camera 110, the control of the caution cannot be properly performed in some cases.

For solving such a technical problem, the vehicle lighting system 10 according to the embodiment performs an operation described in detail below.

<Operation of Vehicle Lighting System>

Figure 3:
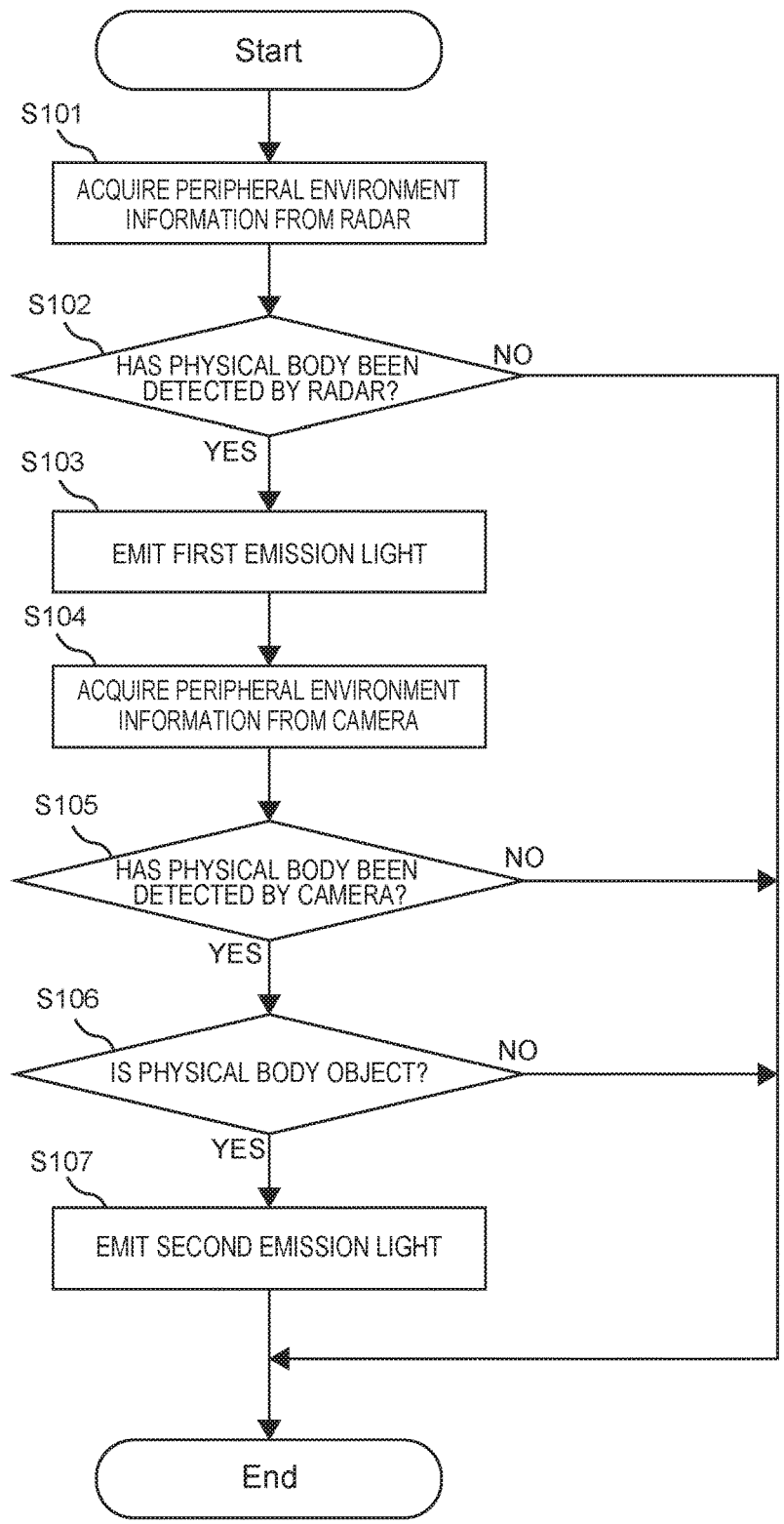
FIG. 3 is a flowchart showing a flow of an operation of the vehicle lighting system according to the first embodiment.

An operation of the vehicle lighting system 10 according to the embodiment will be described in detail with reference to FIG. 3. Here, FIG. 3 is a flowchart showing a flow of the operation of the vehicle lighting system according to the embodiment. The processes shown in the flowchart of FIG. 3 are executed by the units of the ECU 200, at the time of the operation of the vehicle lighting system 10.

In FIG. 3, the peripheral environment information detected by the radar 120 is acquired by the information acquisition unit 210, at the time of the operation of the vehicle lighting system 10 according to the embodiment (step S101). The peripheral environment information acquired by the information acquisition unit 210 is output to the detection determination unit 220.

Subsequently, the detection determination unit 220 determines whether the physical body existing in the periphery of the own vehicle 20 has been detected by the radar 120 (step S102). Here, when the physical body has not been detected by the radar 120 (step S102: NO), the subsequent processes are omitted, and a sequence of processes is ended. This is because it can be determined that the physical body as the object of the caution does not exist in the periphery of the own vehicle 20. In this case, the ECU 200 may perform the process of step S101 again, after the elapse of a predetermined time.

On the other hand, when the physical body has been detected by the radar 120 (step S102: YES), the first emission control unit 230 outputs, to the emission unit 300, the command to emit the first emission light to the physical body (step S103). Thereby, the first emission light is emitted to the detected physical body.

When the first emission light is emitted to the physical body, the physical body is illuminated with the first emission light, and becomes likely to be detected by the on-vehicle camera 110. Here, the physical body (for example, a pedestrian) to which the first emission light has been emitted may recognize that the light is being emitted to itself. In this case, the physical body possibly pays some attention to a direction from which the first emission light is being emitted (that is, a direction of the own vehicle 20). Therefore, the first emission light may be regarded as having also a function to give a caution to the physical body. However, the first emission light may have a low caution effect, or may have no caution effect at all.

After the emission of the first emission light, the information acquisition unit 210 acquires the peripheral environment information detected by the on-vehicle camera 110 in the state where the first emission light is being emitted (step S104). The peripheral environment information acquired by the information acquisition unit 210 is output to the detection determination unit 220.

Subsequently, the detection determination unit 220 determines whether the physical body detected in step S102 has been detected (step S105). That is, while the detection of the physical body is determined in step S102 based on the peripheral environment information from the radar 120, the detection of the physical body is determined in step S105 based on the peripheral environment information from the on-vehicle camera 110.

When it is determined that the physical body has not been detected by the on-vehicle camera 110 (step S105: NO), the subsequent processes are omitted, and a sequence of processes is ended. This is because it can be determined that the caution cannot be properly given to the physical body that cannot be detected by the on-vehicle camera 110 as described later. In this case, the ECU 200 may perform the process of step S101 again, after the elapse of a predetermined time.

On the other hand, when it is determined that the physical body has been detected by the on-vehicle camera 110 (step S105: YES), the emission object determination unit 240 determines whether the detected physical body is the object (step S106).

Here, particularly, whether the physical body is the object is determined based on the peripheral environment information containing the detection result of the on-vehicle camera 110. Specifically, the determination is made based on not only the position and moving speed of the physical body, which can be detected by the radar 120, but also the attribute and others of the physical body, which are detected by the on-vehicle camera 110. Alternatively, whether the physical body is the object may be determined based on only the information detected by the on-vehicle camera 110. Therefore, whether the physical body is the object cannot be exactly determined in the state where the physical body has not been detected by the on-vehicle camera 110.

However, particularly, in the embodiment, whether the physical body is the object is determined in the state where the physical body has been detected by the on-vehicle camera 110. Accordingly, whether the physical body is the object can be properly determined.

When it is determined that the physical body is the object (step S106: YES), the second emission control unit 250 outputs, to the emission unit 300, the command to emit the second emission light toward the object (step S107). Thereby, the second emission light is emitted to the object. The second emission light is emitted as the light that can be visually recognized by the object. The object after visually recognizing the second emission light is expected to pay attention to the own vehicle 20.

On the other hand, when it is determined that the physical body is not the object (step S106: NO), the process of step S107 is omitted. That is, the second emission light is not emitted to the detected physical body. Thereby, it is possible to avoid the second emission light from being emitted to a physical body to which the caution should not be given.

As described above, a sequence of processes is ended after the process of step S106 or step S107, but the ECU 200 may perform the process of step S101 again, after a predetermined time has elapsed since the processes.

<Specific Exemplary Emissions>

In the following, exemplary emissions by the vehicle lighting system 10 according to the embodiment will be specifically described.

Figure 4:
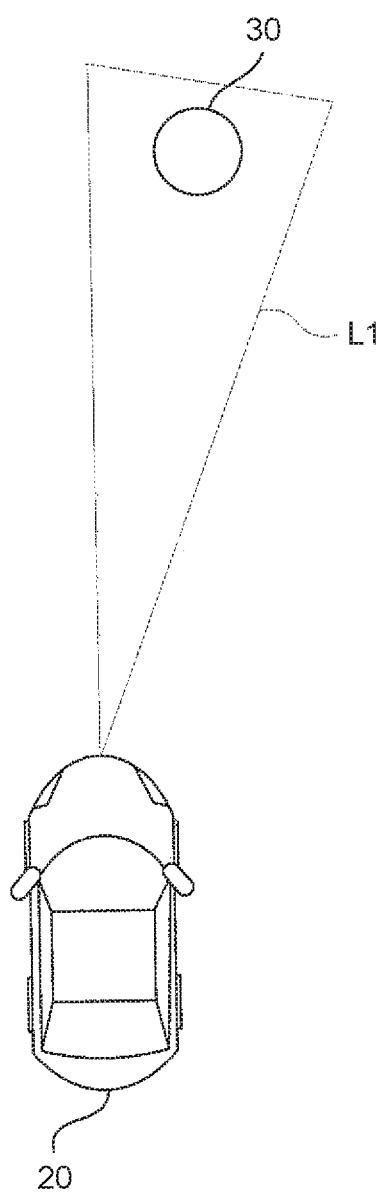
FIG. 4 is a top view showing an exemplary emission of a first emission light.
Figure 5:
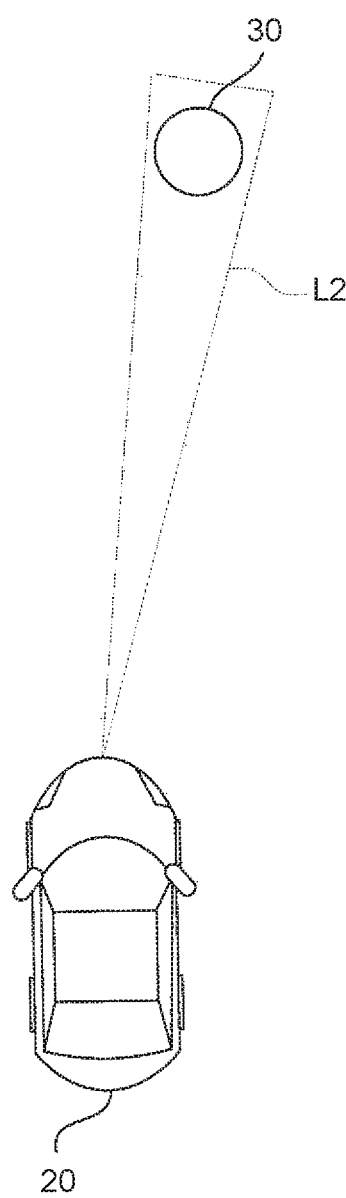
FIG. 5 is a top view showing an exemplary emission of a second emission light.

First, differences between the first emission light and the second emission light will be described with reference to FIG. 4 to FIG. 6. Here, FIG. 4 is a top view showing an exemplary emission of the first emission light, and FIG. 5 is a top view showing an exemplary emission of the second emission light. Further, FIG. 6 is a table showing difference in emission form between the first emission light and the second emission light.

As shown in FIG. 4 and FIG. 5, a first emission light L1 and a second emission light L2 are common in that the first emission light L1 and the second emission light L2 are emitted toward a physical body 30 existing in front of the own vehicle 20. However, as already described, the first emission light L1 is emitted at the stage where the physical body has been detected by the radar 120, and allows for the improvement of the detection result of the on-vehicle camera 110. The emission range of the first emission light L1 is set so as to be wider, such that the whole of the physical body 30 is illuminated. The second emission light L2 is emitted at the stage where the physical body has been detected by the on-vehicle camera 110, and allows for the caution to the physical body 30. The second emission light L2 is emitted as a light having a higher directivity to the physical body 30 (in other words, a light having a narrower emission range).

As shown in FIG. 6, the first emission light L1 and the second emission light L2 may be different in emission form, other than the emission range. Specifically, the first emission light L1 may be emitted as a darker light (a light having a relatively lower illuminance), in order to prevent the physical body 30 from being blinded. Meanwhile, the second emission light L2 may be emitted as a brighter light (a light having a relatively higher illuminance), in order to enhance the effect of the caution to the physical body 30. Further, the first emission light L1 may be emitted as a white light, for brightly illuminating the physical body 30. Meanwhile, the second emission light L2 may be emitted as a pale orange light, in order to enhance the effect of the caution to the object. Furthermore, the first emission light L1 may be emitted as a light that constantly appears, and meanwhile, the second emission light L2 may be emitted as a light for which appearance and disappearance are repeated (that is, as a flashing light), in order to enhance the effect of the caution to the object.

Next, an exemplary emission when the second emission light is emitted as a light that draws an emission pattern will be described with reference to FIG. 7. Here, FIG. 7 is a top view showing the exemplary emission when the second emission light draws the emission pattern.

Figure 7:
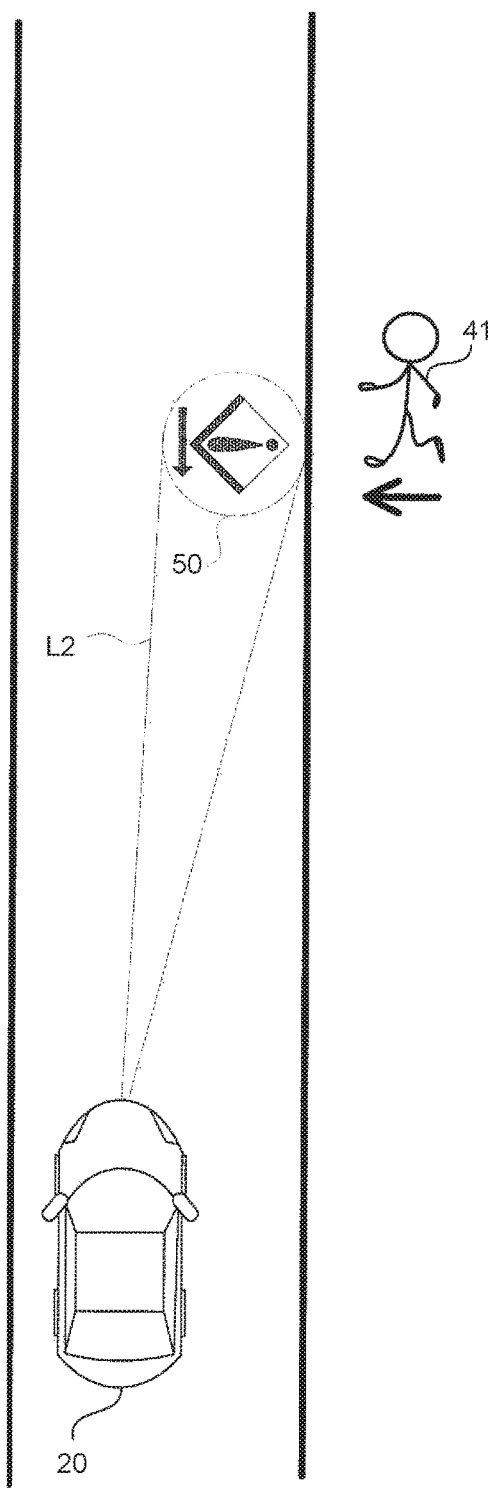
FIG. 7 is a top view showing an exemplary emission when an emission pattern is drawn by the second emission light.

Suppose that a pedestrian 41 to cross a roadway exists in front of the own vehicle 20 as shown in FIG. 7. In this case, if the pedestrian 41 continues to cross the roadway, there is a possibility of the contact with the own vehicle 20.

Therefore, for giving the caution to the pedestrian 41, the own vehicle 20 emits the second emission light L2 to a road surface in a predetermined range in the periphery of the pedestrian, to draw an emission pattern 50 on the road surface. The emission pattern 50 is drawn as a pattern containing an "exclamation mark" and an "arrow pointing to the left (as viewed from the pedestrian)".

The pedestrian 41 after visually recognizing the emission pattern 50 can recognize "danger" from the "exclamation mark". Further, the pedestrian 41 can recognize "to pay attention to the left direction" from the "arrow pointing to the left". As a result, the pedestrian 41 is expected to pay attention to the left direction as viewed from himself, and can suitably avoid the collision with the own vehicle 20.

Here, the above-described emission pattern 50 is just one example, and even when a different pattern is used, the same effect is obtained if the pattern has a shape allowing for the caution to the pedestrian 41.

Next, an exemplary emission when the second emission light is emitted to a particular part of a pedestrian will be described with reference to FIG. 8. Here, FIG. 8 is a top view showing the exemplary emission when the second emission light is emitted to a particular part of a pedestrian.

Figure 8:
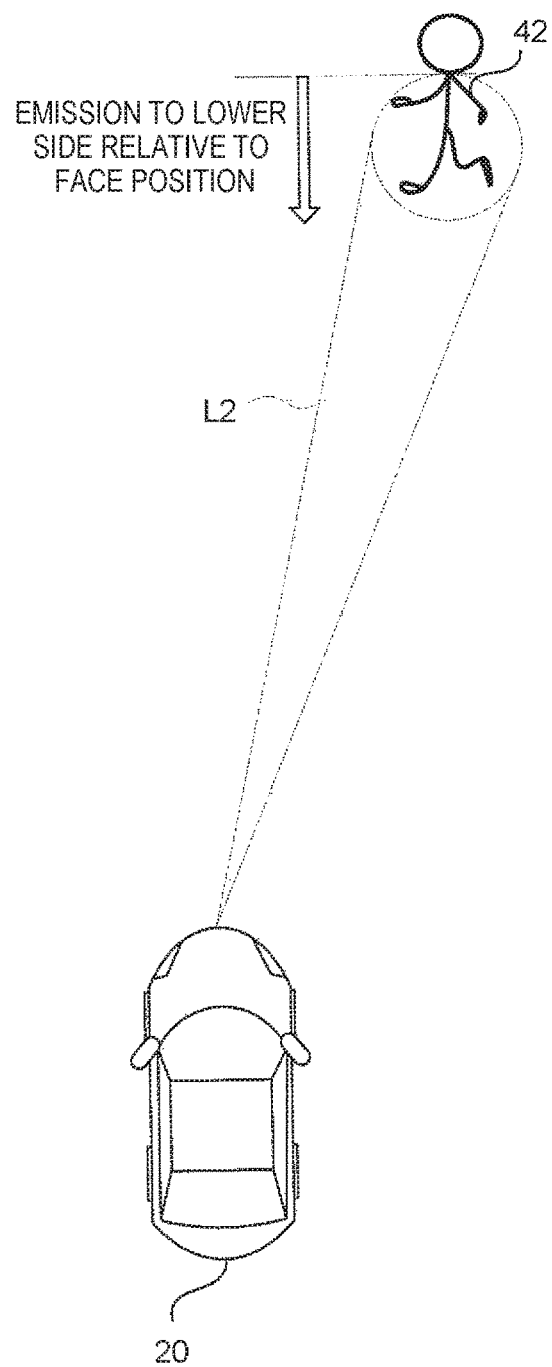
FIG. 8 is a top view showing an exemplary emission when the second emission light is emitted to a particular part of a pedestrian.

Suppose that a pedestrian 42 is walking in front of the own vehicle 20 as shown in FIG. 8. In such a case, the caution needs to be given with the second emission light L2, for avoiding the contact with the own vehicle 20.

However, if the second emission light L2 is emitted toward a face position of the pedestrian 42, there is a possibility that the pedestrian 42 is blinded. In this case, depending on the situation, it is possible that the caution effect decreases.

For avoiding such a disadvantage, the second emission control unit 250 determines whether the object is a "human" (for example, a pedestrian), before the emission of the second emission light L2. Then, when it is determined that the object is a "human", the second emission control unit 250 performs such a control that the second emission light L2 is emitted to a lower side relative to the face position of the human (that is, the pedestrian 42). Here, when the second emission light L2 is emitted to the lower side relative to the face position, the second emission light L2 may be emitted after the detection of the face position, or the second emission light L2 may be emitted to a region that is previously set depending on an average face position of humans.

By emitting the second emission light L2 while avoiding the face position of the pedestrian 42 as described above, it is possible to avoid the pedestrian 42 from being blinded and to suitably give the caution.

<Effect of Embodiment>

Finally, advantageous technical effects to be obtained by the vehicle lighting system 10 according to the embodiment will be described.

As described with use of FIG. 1 to FIG. 3, in the vehicle lighting system 10 according to the embodiment, the first emission light L1 is emitted toward the physical body 30, at the stage where the physical body has been detected by the radar 120. Thereby, the physical body 30 is brightly illuminated, and therefore, it is possible to achieve the improvement of the detection result of the on-vehicle camera 110.

By the improvement of the detection result of the on-vehicle camera 110, the detailed information about the physical body 30 is obtained. Thereby, it is possible to suitably give the caution with the second emission light L2. That is, it is possible to give a more effective caution using the attribute and others of the physical body 30.

As described with use of FIG. 4 to FIG. 8, when the first emission light L1 and the second emission light L2 are emitted in proper forms depending on the purpose, it is possible to further enhance the above-described technical effects. Specifically, by properly setting the emission range, the illuminance, the color tone, the on-off of flashing and the like (see FIG. 6), it is possible to enhance the effect of the improvement of the detection result of the on-vehicle camera 110 with the first emission light L1 and the effect of the caution with the second emission light L2. Further, it is possible to enhance the effect of the caution with the second emission light L2, also by the drawing of the emission pattern 50 by the second emission light L2 (see FIG. 7) or the emission to a particular part of the physical body 30 (see FIG. 8).

Second Embodiment

Next, a vehicle lighting system according to the second embodiment will be described with reference to FIG. 9 to FIG. 11. Here, the second embodiment is different from the already-described first embodiment, only in some parts of the configuration and operation, and is the same in many other parts. Therefore, hereinafter, the different parts from the first embodiment will be described in detail, and the description of the other repetitive parts will be omitted when appropriate.

<Configuration of Vehicle Lighting System>

First, a configuration of the vehicle lighting system according to the second embodiment will be described with reference to FIG. 9. Here, FIG. 9 is a block diagram showing the configuration of the vehicle lighting system according to the second embodiment.

Figure 9:
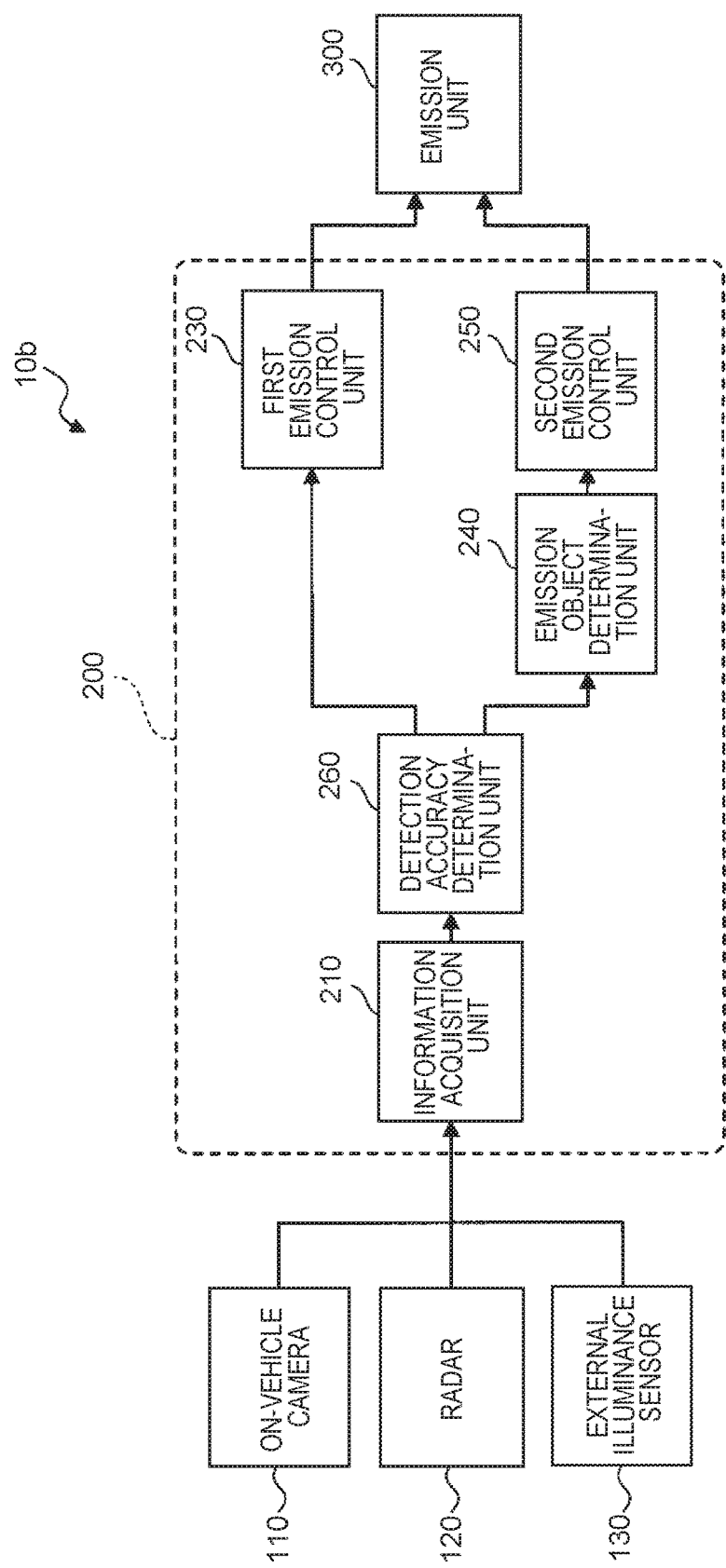
FIG. 9 is a block diagram showing a configuration of a vehicle lighting system according to a second embodiment.

In FIG. 9, a vehicle lighting system 10b according to the second embodiment is configured to include an external illuminance sensor 130, in addition to the configuration (see FIG. 1) of the first embodiment. Further, the vehicle lighting system 10b includes a detection accuracy determination unit 260, instead of the detection determination unit 220 of the ECU 200.

The external illuminance sensor 130 is a sensor configured to be able to detect external illuminance in the periphery of the vehicle. Here, the "external illuminance" is a parameter indicating brightness in the periphery of the vehicle, and is detected as a higher value as the brightness increases. The external illuminance detected by the external illuminance sensor 130 is output to the information acquisition unit 210.

The detection accuracy determination unit 260 is configured to be able to determine whether the detection result of the on-vehicle camera 110 is not insufficient, based on the peripheral environment information. The "insufficient" state herein means a state where the detection by the on-vehicle camera 110 has not been actualized at an originally intended level (in other words, a state where the information supposed to be obtained from the on-vehicle camera 110 has not been obtained). For example, the "insufficient" state may be a state where the information necessary to decide the object to which the second emission light is emitted has not been obtained. Specifically, the "insufficient" state includes not only a state where a physical body supposed to exist has not been detected by the on-vehicle camera 110, but also a state where the attribute of the physical body cannot be discriminated, a state where detection reliability is lower than a predetermined threshold, and the like. A specific determination method in the detection accuracy determination unit 260 will be described in detail later, in the explanation of the operation. The detection accuracy determination unit 260 is configured to be able to output the peripheral environment information (containing the information about the detected physical body) to the first emission control unit 230 or the emission object determination unit 240, depending on the determination result.

<Operation of Vehicle Lighting System>

An operation of the vehicle lighting system 10b according to the second embodiment will be described in detail with reference to FIG. 10. Here, FIG. 10 is a flowchart showing a flow of the operation of the vehicle lighting system according to the second embodiment. The processes shown in the flowchart of FIG. 10 are executed by the units of the ECU 200, at the time of the operation of the vehicle lighting system 10b.

Figure 10:
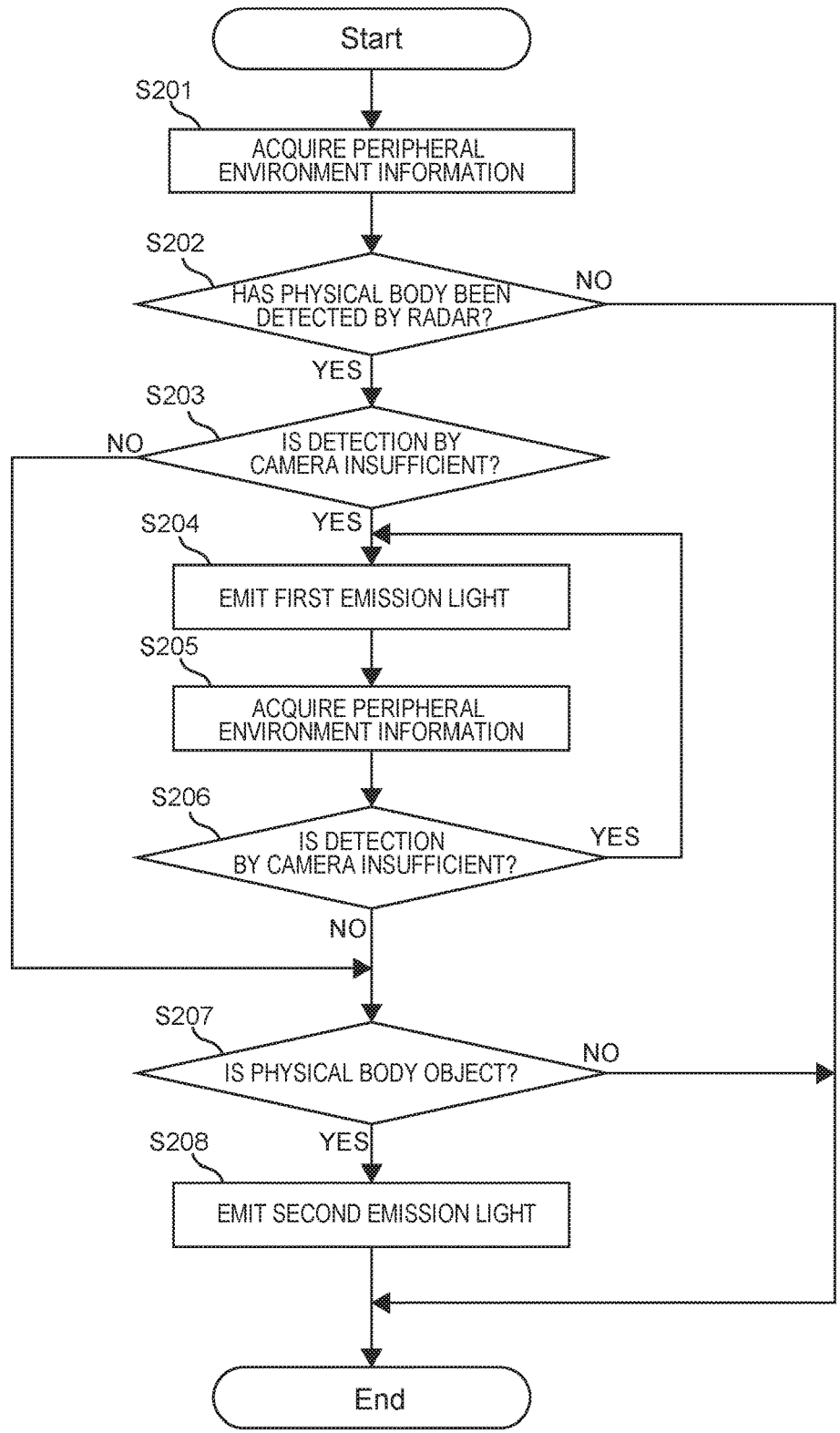
FIG. 10 is a flowchart showing a flow of an operation of the vehicle lighting system according to the second embodiment.

In FIG. 10, the peripheral environment information detected by the on-vehicle camera 110, the radar 120 and the external illuminance sensor 130 is acquired by the information acquisition unit 210, at the time of the operation of the vehicle lighting system 10b according to the second embodiment (step S201). The peripheral environment information acquired by the information acquisition unit 210 is output to the detection accuracy determination unit 260.

Subsequently, the detection accuracy determination unit 260 determines whether the physical body existing in the periphery of the own vehicle 20 has been detected by the radar 120 (step S202). Here, when the physical body has not been detected by the radar 120 (step S202: NO), the subsequent processes are omitted, and a sequence of processes is ended. This is because it can be determined that the physical body as the object of the caution does not exist in the periphery of the own vehicle 20. In this case, the ECU 200 may perform the process of step S201 again, after the elapse of a predetermined time.

On the other hand, when the physical body has been detected by the radar 120 (step S202: YES), the detection accuracy determination unit 260 determines whether the detection result of the on-vehicle camera 110 about the detected physical body is insufficient (step S203). Whether the detection result of the on-vehicle camera 110 is insufficient is determined based on the peripheral environment information.

Specifically, the detection accuracy determination unit 260 determines that the detection result of the on-vehicle camera 110 is insufficient, when the existence of the physical body detected by the radar 120 cannot be detected by the on-vehicle camera 110. Such a situation can be satisfied, for example, when the situation at the time of the detection of the physical body A shown in FIG. 2 is a situation where adverse effect can be exerted on the capture of the physical body A by the on-vehicle camera 110 using visible light (that is, a situation of a dark environment during night-time or the like). In this case, the information about the physical body that is supposed to be intrinsically obtained from the on-vehicle camera 110 is not obtained.

Alternatively, the detection accuracy determination unit 260 may determine that the detection result of the on-vehicle camera 110 is insufficient, when the attribute of the physical body detected by the radar 120 cannot be discriminated from the information of the on-vehicle camera 110. Specifically, the situation is a situation where the existence of a certain physical body can be detected by the on-vehicle camera 110 but the attribute cannot be discriminated because of unclear image data or the like. In this case, although the information about the physical body can be obtained in some degree from the on-vehicle camera 110, the information is deficient compared to the information supposed to be intrinsically obtained.

Alternatively, the detection accuracy determination unit 260 may determine that the detection result of the on-vehicle camera 110 is insufficient, when the detection reliability of the on-vehicle camera 110 is lower than a predetermined threshold. Here, the "detection reliability" is a parameter indicating probability of the information obtained from the on-vehicle camera 110, and can be calculated using a predetermined calculation method.

In the following, the detection reliability of the on-vehicle camera 110 will be described in detail with reference to FIG. 11. Here, FIG. 11 is a map showing an example of a calculation method for the detection reliability.

Figure 11:
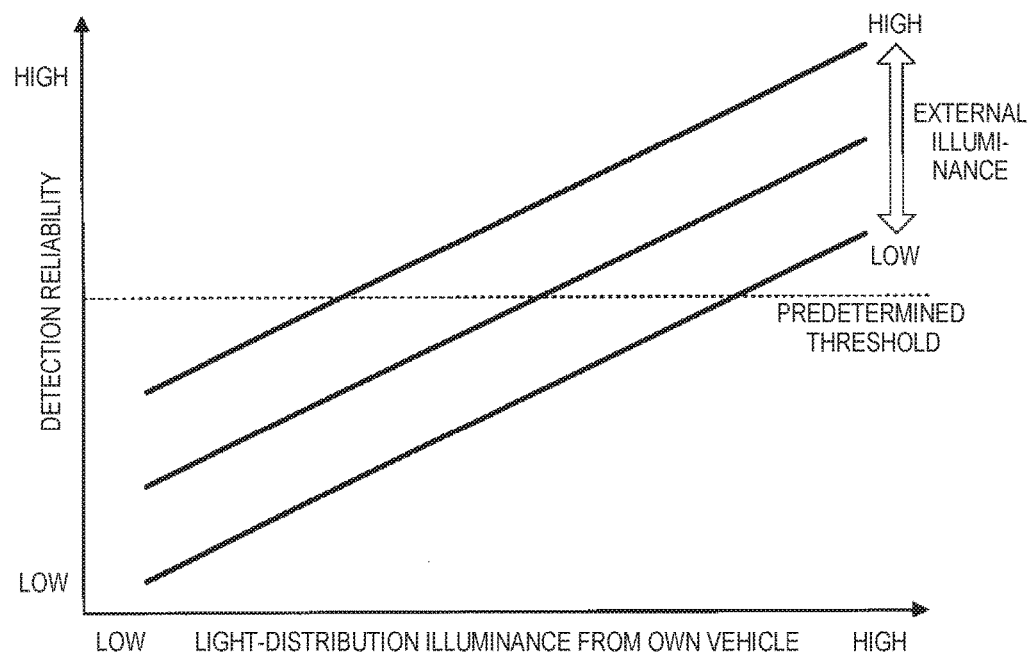
FIG. 11 is a map showing an example of a calculation method for detection reliability.

As shown in FIG. 11, the detection reliability of the on-vehicle camera 110 is calculated based on a light-distribution illuminance from the own vehicle 20 (specifically, a light-distribution illuminance at the existence position of the physical body detected by the radar 120) and the external illuminance detected by the external illuminance sensor 130. More specifically, the detection reliability is calculated as a higher value, as the light-distribution illuminance from the own vehicle 20 is higher or as the external illuminance is higher. Here, in the example shown in FIG. 11, three straight lines depending on the level of the external illuminance are drawn, but such straight lines may be shifted linearly and vertically depending on the level of the external illuminance.

For the detection reliability, a predetermined threshold for determining whether the value is sufficiently high is set. By an advance simulation or the like, the predetermined threshold is set to a value allowing for the determination of whether the information about the physical body is exactly obtained from the on-vehicle camera 110 in the situation. For example, the predetermined threshold may be set to a value corresponding to the detection reliability when the information about the physical body to be obtained from the on-vehicle camera 110 is the minimum permissible information (or a value resulting from adding a margin to the value).

When the calculated detection reliability is equal to or higher than the predetermined threshold, it is determined that the detection result of the on-vehicle camera 110 is sufficient. On the other hand, when the calculated detection reliability is lower than the predetermined threshold, it is determined that the detection result of the on-vehicle camera 110 is insufficient.

Here, the above-described calculation method for the detection reliability is just one example, and the calculation can be also performed by using another existing technology.

The determination of the detection result described above only needs to be performed based on at least one of whether the detection is possible, whether the discrimination of the attribute is possible, and the detection reliability. Further, the determination of the detection result may be executed based on each of whether the detection is possible, whether the discrimination of the attribute is possible, and the detection reliability, and in addition, may be executed based on a combination of them. Further, the determination of the detection result may be executed based on a combination with a condition not described herein.

Back to FIG. 10, when it is determined that the detection by the on-vehicle camera 110 is insufficient (step S203: YES), the first emission control unit 230 outputs, to the emission unit 300, the command to emit the first emission light (step S204). Thereby, the first emission light is emitted to the detected physical body.

The emission of the first emission light is performed based on the detection results of the on-vehicle camera 110 and the radar 120. Specifically, from the information about the physical body that is detected by the radar 120 and for which it is determined that the detection result of the on-vehicle camera 110 is insufficient, a proper emission direction and emission range are decided, and the control is executed such that the first emission light is surely emitted to the physical body. Here, such a control that the first emission light is not emitted may be performed, for a physical body for which it is determined that the first emission light does not have to be emitted from the detection results of the on-vehicle camera 110 and the radar 120 at this time (that is, it is obvious at the present time that the physical body is not the object of the caution, and it is not necessary to obtain more detailed information).

After the emission of the first emission light, the information acquisition unit 210 acquires the peripheral environment information again (step S205). The peripheral environment information acquired by the information acquisition unit 210 is output to the detection accuracy determination unit 260.

Subsequently, the detection accuracy determination unit 260 determines whether the detection result of the on-vehicle camera 110 about the detected physical body is insufficient (step S206). That is, the same process as the step S203 is performed again.

When it is determined that the detection result of the on-vehicle camera 110 is insufficient (step S206: YES), the processes of step S204 to step S206 are executed repeatedly. That is, the emission of the first emission light is continued. However, for avoiding the processes of step S204 to step S206 from being endlessly repeated due to an unintended situation (for example, the failure of the on-vehicle camera 110 or the radar 120), an exceptional process for terminating a sequence of processes may be performed when the detection result is insufficient even after a predetermined number or more of repeats.

On the other hand, when it is determined that the detection result of the on-vehicle camera 110 is not insufficient (step S206: NO), the ECU 200 proceeds to the processes of step S207 and step S208. When it is determined in step S203 that the detection result of the on-vehicle camera 110 is not insufficient (step S203: NO), step S204 to step S206 described above are omitted, and the processes of step S207 and step S208 are directly started.

When the detection result of the on-vehicle camera 110 becomes sufficient, the emission object determination unit 240 determined whether the detected physical body is the object (step S207).

When it is determined that the physical body is the object (step S207: YES), the second emission control unit 250 outputs, to the emission unit 300, the command to emit the second emission light (step S208). Thereby, the second emission light is emitted to the object. The second emission light is emitted as the light that can be visually recognized by the object. The object after visually recognizing the second emission light is expected to pay attention to the own vehicle 20. The ECU 200 may perform the process of step S201 again, after a predetermined time has elapsed since the process of step S208.

On the other hand, when it is determined that the physical body is not the object (step S207: NO), the process of step S208 is omitted. That is, the second emission light is not emitted to the detected physical body. Thereby, it is possible to avoid the second emission light from being emitted to a physical body to which the caution should not be given. In this case, the ECU 200 may perform the process of step S201 again, after the elapse of a predetermined time.

<Effect of Embodiment>

Finally, advantageous technical effects to be obtained by the vehicle lighting system 10*b* according to the second embodiment will be described.

As described with use of FIG. 9 to FIG. 11, in the vehicle lighting system 10*b* according to the second embodiment, the first emission light L1 is emitted toward the physical body 30, when it is determined that the detection result of the on-vehicle camera 110 is insufficient. Thereby, the physical body 30 is brightly illuminated, and therefore, it is possible to achieve the improvement of the detection result of the on-vehicle camera 110.

By the improvement of the detection result of the on-vehicle camera 110, the detailed information about the physical body 30 is obtained. Thereby, it is possible to suitably give the caution with the second emission light L2. That is, it is possible to give a more effective caution using the attribute and others of the physical body 30.

Further, when it is determined that the detection result of the on-vehicle camera 110 is not insufficient, whether the physical body is the object to which the caution needs to be given is determined without the emission of the first emission light L1. Thereby, it is possible to minimize the number of times of the emission of the first emission light L1. That is, it is possible to suppress the possibility that a pedestrian or the like is blinded by the emission of the first emission light L1, for example.

What is claimed is:

1. A vehicle lighting system comprising:
   a lighting device configured to emit a first light and a second light to a periphery of a vehicle, the second light having a higher directivity than the first light;
   a camera configured to acquire image information by capturing a periphery of the vehicle;
   a detector configured to emit an electromagnetic wave to the periphery of the vehicle and acquire a reflection wave of the electromagnetic wave; and
   an electronic control unit configured to:
   detect a physical body in the periphery of the vehicle using the image information,
   detect the physical body using information of the reflection wave,
   control the lighting device such that the lighting device emits the first light to the physical body and illuminates an entirety of the physical body, in response to the physical body being detected based on the reflection wave,
   determine whether the physical body detected using the image information is a target object to which a caution indication needs to be provided, in a state where the first light is emitted towards the physical body, and
   control the lighting device such that the lighting device emits the second light toward a predetermined range around the target object, in response to the physical body being determined to be the target object to which the caution indication needs to be provided.

2. The vehicle lighting system according to claim 1, wherein
   the electronic control unit is configured to
   determine whether a detection result of the camera acquired without an emission of the first light is insufficient to determine whether the physical body is the target object, and
   control the lighting device such that the lighting device emits the first light to the physical body, when determining that the detection result of the camera is insufficient.

3. The vehicle lighting system according to claim 2, wherein
   the electronic control unit is configured to
   determine whether a detection result of the camera about the physical body in the state where the first light is being emitted is insufficient to determine whether the physical body is the target object, and
   determine whether the physical body is the target object, when the detection result of the camera in the state where the first light is being emitted is not insufficient.

4. The vehicle lighting system according to claim 2, wherein
   the electronic control unit is configured to
   control the lighting device such that the lighting device does not emit the first light to the physical body, when the detection result of the camera is determined to be not insufficient, and
   determine whether the physical body detected by the camera in a state where the first light is not being emitted is the object, when the detection result of the camera is determined to be not insufficient.

5. The vehicle lighting system according to claim 3, wherein
   the electronic control unit is configured to control the lighting device such that the lighting device continues to emit the first light to the physical body, when the detection result of the camera in the state where the first light is being emitted is determined to be insufficient.

6. The vehicle lighting system according to claim 2, wherein
   the electronic control unit is configured to determine that the detection result of the camera is insufficient, when existence of the physical body is detected by the detector and is not been detected by the camera.

7. The vehicle lighting system according to claim 2, wherein
   the electronic control unit is configured to determine that the detection result of the camera is insufficient, when an attribute of the physical body is unable to be discriminated from the detection result of the camera.

8. The vehicle lighting system according to claim 2, wherein
   the electronic control unit is configured to determine that the detection result of the camera is insufficient, when detection reliability for the physical body is lower than a predetermined threshold.

9. The vehicle lighting system according to claim 1, wherein
an emission range of the first light is wider than an emission range of the second light.

10. The vehicle lighting system according to claim 1, wherein
an illuminance of the first light is lower than an illuminance of the second light.

11. The vehicle lighting system according to claim 1, wherein
the first light and the second light are different in color tone from each other.

12. The vehicle lighting system according to claim 1, wherein
the electronic control unit is configured to control the lighting device such that the lighting device repeats emission and stopping of the second light at a predetermined interval.

13. The vehicle lighting system according to claim 1, wherein
the second light is emitted as a light that draws a predetermined pattern.

14. The vehicle lighting system according to claim 1, wherein
the electronic control unit is configured to:
determine whether the physical body is a human, and
control the lighting device such that the lighting device emits the second light to a lower side relative to a face position of the human, when determining that the physical body is the human.

15. The vehicle lighting system according to claim 1, wherein
the electronic control unit is configured to determine whether the physical body is the target object, based on the image information obtained in the state where the first light is being emitted and the information of the reflection wave.

16. The vehicle lighting system according to claim 13, wherein
the second light draws an image containing a figure of an arrow, on a road surface in front of the target object, the arrow pointing from the target object towards the vehicle.

* * * * *